United States Patent [19]

Schneider

[11] Patent Number: 5,031,386
[45] Date of Patent: Jul. 16, 1991

[54] TUBULAR BAGGING MACHINE

[75] Inventor: Werner Schneider, Hohenahr, Fed. Rep. of Germany

[73] Assignee: Rovema Verpackungsmachinen GmbH, Fernwald-Annerod, Fed. Rep. of Germany

[21] Appl. No.: 430,630

[22] Filed: Nov. 1, 1989

[30] Foreign Application Priority Data

Nov. 7, 1988 [DE] Fed. Rep. of Germany ....... 3837709

[51] Int. Cl.⁵ .................... B65B 9/08; B65B 51/16
[52] U.S. Cl. ................................. 53/551; 53/370.7
[58] Field of Search ............... 53/371, 373, 451, 526, 53/528, 548, 550, 551, 552, 553, 554, 555

[56] References Cited

U.S. PATENT DOCUMENTS

| | | | |
|---|---|---|---|
| 2,915,866 | 12/1959 | Bartlo | 53/124 |
| 3,045,404 | 7/1962 | Wilson | 53/551 |
| 3,055,154 | 9/1962 | Markley et al. | 53/182 |
| 3,070,931 | 1/1963 | Zwight | 53/552 |
| 3,256,673 | 6/1966 | Tew et al. | 53/182 |
| 3,381,441 | 5/1968 | Condo et al. | 53/24 |
| 3,422,596 | 1/1969 | Lyster et al. | 53/568 |
| 3,438,173 | 4/1969 | Omori | 53/373 |
| 3,522,689 | 8/1970 | Wylie et al. | 53/182 |
| 3,685,250 | 8/1972 | Henry et al. | 53/180 |
| 3,850,780 | 11/1974 | Crawford et al. | 156/583 |
| 3,892,060 | 7/1975 | Stanley | 53/127 |
| 3,982,381 | 9/1976 | Bolli | 53/373 |
| 4,199,919 | 4/1980 | Moscatelli | 53/552 |
| 4,291,520 | 9/1981 | Prince et al. | 53/551 |
| 4,433,527 | 2/1984 | Ramsey et al. | 53/548 |
| 4,663,917 | 5/1987 | Taylor et al. | 53/552 |
| 4,750,313 | 6/1988 | Kammler et al. | 53/552 X |
| 4,751,808 | 6/1988 | Hadden | 53/451 |
| 4,757,668 | 7/1988 | Klinkel et al. | 53/451 |
| 4,947,618 | 8/1990 | Schneider et al. | 53/373 |

FOREIGN PATENT DOCUMENTS

| | | | |
|---|---|---|---|
| 0308861 | 3/1989 | European Pat. Off. | 53/548 |
| 2224407 | 3/1973 | Fed. Rep. of Germany . | |
| 2751088 | 5/1979 | Fed. Rep. of Germany | 53/552 |
| 3732033 | 4/1989 | Fed. Rep. of Germany . | |
| 935269 | 8/1963 | United Kingdom . | |
| 1389746 | 4/1975 | United Kingdom . | |

Primary Examiner—John Sipos
Assistant Examiner—Linda B. Johnson
Attorney, Agent, or Firm—Flynn, Thiel, Boutell & Tanis

[57] ABSTRACT

The invention relates to a tubular bagging machine comprising at least two cross-welding jaws arranged on opposing sides of a foil tube to be welded and rotating along a self-contained cam track. In order to be able to precisely infuence the amount of air to be enclosed in a tubular bag the invention provides squeezing members such that each one squeezing member is provided in direction of movement in front of the cross-welding jaws, which squeezing memer contacts the tubular bag only over a portion of its width in order to squeeze in this manner the air in the tubular bag out of said bag. The tubular bagging machine of the invention can particularly be used for large tubular bags, in which a defined air cushion must be constructed to protect sensitive goods.

9 Claims, 3 Drawing Sheets

TUBULAR BAGGING MACHINE

CROSS REFERENCE TO RELATED APPLICATION

This application is related to co-pending application Ser. No. 07/247 873, filed Sept. 22, 1988, now U.S. Pat. No. 4,947,618, issued Aug. 14, 1990.

FIELD OF THE INVENTION

The invention relates to a tubular bagging machine comprising at least two cross-welding jaws arranged on opposed sides of a foil tube to be welded and each guided rotatingly on a closed cam track such that the cross-welding jaws can bear against one another and can be separated from one another.

BACKGROUND OF THE INVENTION

A tubular bagging machine of the above-mentioned type is known for example from German OS 22 24 407. This tubular bagging machine provides in combination both a filling and also a welding of the tubular bag, the cross-welding jaws producing thereby simultaneously the upper cross-welding seam of an already filled tubular bag and the lower cross-welding seam of a still empty tubular bag. The upper tubular bag, the lower cross-welding seam of which is produced at this time, is subsequently filled through a fill pipe with material to be packaged. The cam track has the purpose in this tubular bagging machine to adjust the cross-welding jaws cyclically to the movement and filling of the tubular bag, to separate them from the tubular bag and to subsequently press them against the tubular bag. The closed design of the cam track permits a rotating movement of the cross-welding jaws, so that it is possible in particular to move the foil tube on during the welding operation together with the cross-welding jaws.

With conventional tubular bagging machines, it is difficult to enclose purposefully a specific amount of air in the bag together with the material to be packaged. Since the cross-welding jaws, when resting against the foil tube, prevent air or gases from exiting the foil tube due to the bearing pressure needed for welding, the amount of gas enclosed happens rather accidentally depending on the respective design of the tubular bag. Since under certain manufacturing conditions the weight of an already finished tubular bag burdens a foil tube to be welded and pulls same downwardly, same is, depending on the weight of the material to be filled, pulled and stretched downwardly with differing strength, thus also reducing the amount of the enclosed gas compared with a foil tube, which, the moment in which the cross-welding jaws approach the tube, can expand farther due to a smaller pull.

The basic purpose of the invention is to provide a tubular bagging machine of the above-mentioned type, which with a simple design and reliable operation enables a purposeful influence on the amount of gas to be enclosed in a bag.

SUMMARY OF THE INVENTION

The purpose is attained according to the invention by providing a squeezing member movable together with a cross-welding jaw by means of the cam track in direction of movement in front of each cross-welding jaw, which squeezing member can be pressed against the tubular bag contacting same only over a portion of its width.

The tubular bagging machine of the invention has a number of significant advantages. By arranging the squeezing member in front of the cross-welding jaw it is possible to influence the tubular bag before the cross-welding jaws apply a clamping and bearing pressure. Thus it is possible to squeeze by means of the squeezing member a defined amount of air out of the area of a foil tube, which area is to be welded, or rather to press such an amount of air into said foil tube. It is advantageous when pressing the gas or air out of the tubular bag that the squeezing member contacts the tubular bag only over a portion of its width so that several individual air channels are constructed, through which a flow is possible.

It is for example possible with the tubular bagging machine of the invention to manufacture very large bags, which are filled with a delicate material and contain a sufficient, predeterminable air volume acting as a cushion protecting the material against damage. It is possible according to the invention to predetermine the air volume so that the entire volume of the finished tubular bag permits a further processing, for example a stacking or a further packing of the filled bag.

An advantageous further development of the invention provides that the squeezing member includes a carrier, the first end of which is supported jointedly on the cross-welding jaw and the other end of which is provided with a guide roller guided in the cam track. An exact path of movement of the squeezing member is predetermined through this design and in addition, due to the rigid cam track, a purposeful desired pressing of the squeezing member against the foil tube is assured. An associated, even movement of the squeezing member with the welding jaw takes place at the same time, since the squeezing member is coupled to the welding jaw. The squeezing member thus always moves synchronously with the respective cross-welding jaw.

Furthermore it can be advantageous if the cam track is constructed substantially circularly and rectilinearly on the side facing the tubular bag. The rectilinear construction enables the cross-welding jaws and the squeezing members to move together with the foil tube while resting against the foil tube. Thus it is not necessary to carry out the squeezing and/or welding operation on a stationary tube. The circular design facilitates an even rotation of both the cross-welding jaw and the squeezing member during each operating cycle.

The cross-welding jaw is guided in an advantageous manner by means of two guide rollers on the cam track. Thus a tilting or canting is impossible.

Furthermore it can be advantageous if the squeezing member has a length corresponding substantially with the length of the rectilinear area of the cam track. This design increases the bearing surface of he squeezing member against the material of the tubular bag, thus avoiding in particular damages to the tubular bag, caused, for example, by relative movements between the squeezing member and the tube material.

In order to assure that the gas pressed out of the foil tube escapes unhindered and evenly, it can be particularly advantageous if the squeezing member has bearing areas substantially evenly distributed over the width of he squeezing member for resting on the foil tube and for squeezing gas out of the foil tube. The bearing areas are constructed preferably by a spiral spring arranged transversely with respect to the foil tube. This design has furthermore the advantage that a certain resiliency or elasticity is possible in order to avoid a damage to the foil tube. The spiral spring is favorably designed as a tension spring and is mounted in an initially tensioned state, so that a clamping of the tube material between side-by-side lying windings of the spring is avoided.

The invention provides advantageously that several parallel spiral springs are arranged on the carrier. This increases the number of contact points with the foil tube and the squeezing action to be achieved. The spiral springs are arranged preferably transversely with respect to the foil tube.

To assure that the squeezing members do not damage the foil tube in the operating step, in which they are placed and pressed against the foil tube, it can be particularly advantageous if the squeezing member at its front end area not facing the cross-welding seam is bent toward the center of the cam track, namely away from the tube. Thus it is possible particularly in the case of a cam track with a small diameter to place the squeezing member evenly against the foil tube.

It can furthermore be advantageous if two cross-welding jaws and two squeezing members are arranged on each cam track. The rotational speed of the cross-welding jaws and of the squeezing members can in this manner be reduced since during each operating cycle only one half rotation around the cam track is needed. In particular in the case of tubular bags with a short length a significant simplification of the tubular bagging machine is possible in this manner.

It can furthermore be advantageous for safely guiding the cross-welding jaws and the squeezing members if a cam track is provided on each lateral end area of the cross-welding jaw and of the squeezing member, namely the guiding occurs at the respective outer end areas. The danger of a tilting or canting is thus significantly reduced.

The cross-welding jaws and the squeezing members connected thereto are driven preferably through a rotatable drive member supported centrally in the center of the cam track. Since the cross-welding jaw is connected to the squeezing member, it is sufficient if the drive member is each drivingly connected only with the cross-welding jaw.

The oppositely lying cross-welding jaws, squeezing members and cam tracks are advantageously each designed symmetrically in order to guarantee a two-sided, even treatment of a tubular bag.

BRIEF DESCRIPTION OF THE DRAWINGS

The invention will be described hereinafter in connection with one exemplary embodiment and the drawings, in which.

DETAILED DESCRIPTION

Figure 1:
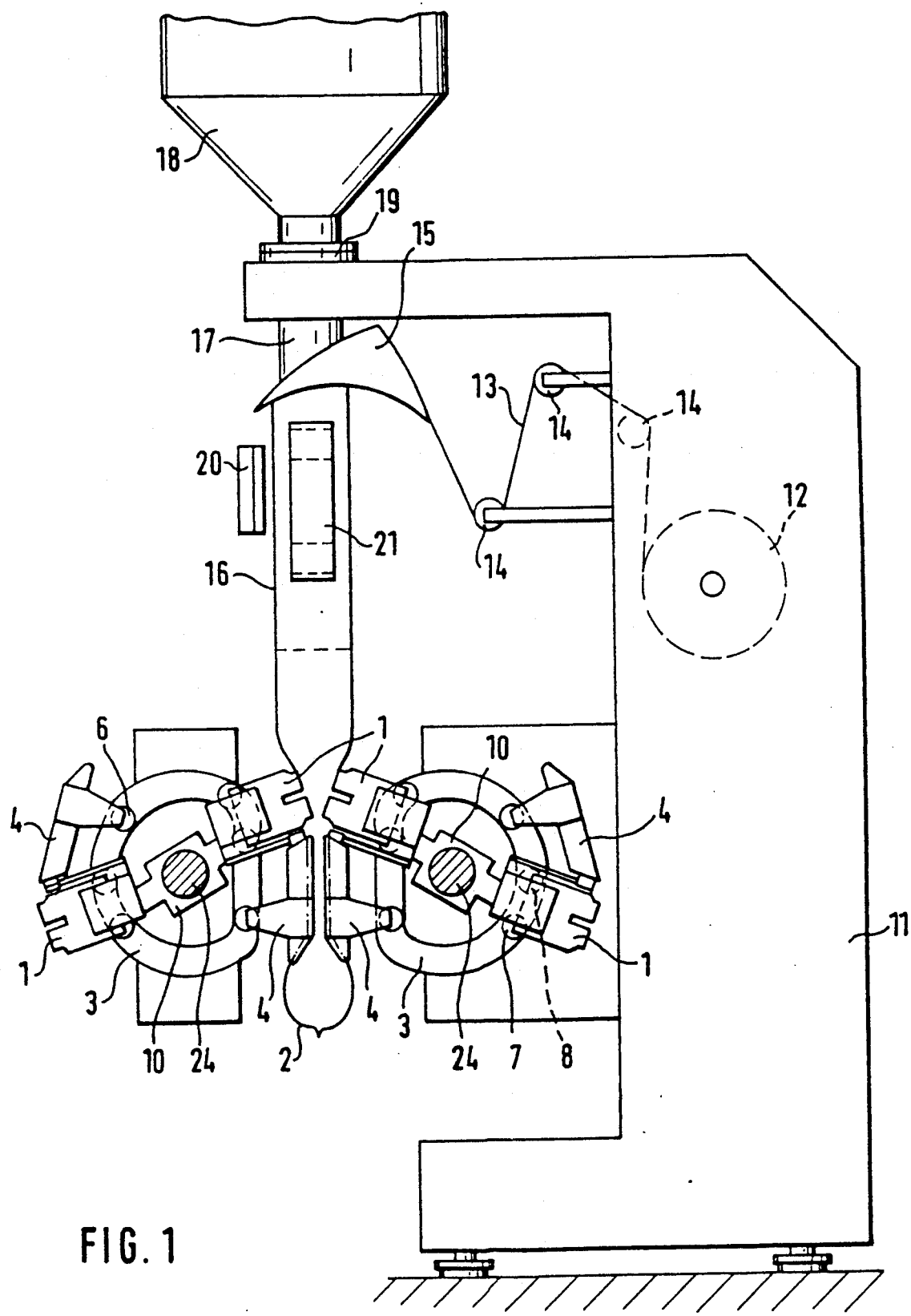
FIG. 1 is a schematic side view of one exemplary embodiment of the tubular bagging machine of the invention.

One exemplary embodiment of a tubular bagging machine of the invention is schematically illustrated in a side view in FIG. 1. This tubular bagging machine includes a frame 11, on which a roll 12 is supported consisting of a foil material or a similar material, out of which tubular bag 2 to be constructed subsequently is supposed to be manufactured. The foil strand or sheet 13 removed from the roll 12 is fed over guide rollers 14 to a forming shoulder 15, which tubularly guides the foil strand 13. A fill pipe 17 is arranged centrally with respect to the now constructed foil tube 16. The fill pipe 17 communicates at its upper side with a container 18 for storing the material to be filled into the tube. A closing mechanism 19 is provided at the transition between the fill pipe 17 and the container 18 so that the filler can be fed selectively to the fill pipe 17.

A longitudinal welding jaw 20 is arranged below the forming shoulder 15. The welding jaw 20 carries out the longitudinal welding or sealing of the foil tube 16. Driving belts 21 for the transporting the foil tube 16 are furthermore provided in the area of the fill pipe 17.

Cam tracks 3, on which cross-welding jaws 1 are guided, are constructed at the lower area of the tubular bagging machine on both sides of the foil tube 16 or rather of the tubular bag 2 to be constructed. The cam tracks 3 are each substantially circularly constructed but have a rectilinear area on the side facing the tubular bag 2.

The cross-welding jaws 1 are used to construct two cross-welding seams or cross-sealing seams, which are parallel to one another. One cross-welding seam forms thereby the upper end of a lower tubular bag, the other cross-welding seam forms the lower end area of a following tubular bag.

Squeezing members 4 are arranged according to the invention in front of the cross-welding jaws. These squeezing members will be described in detail in connection with FIG. 4.

Figure 4:
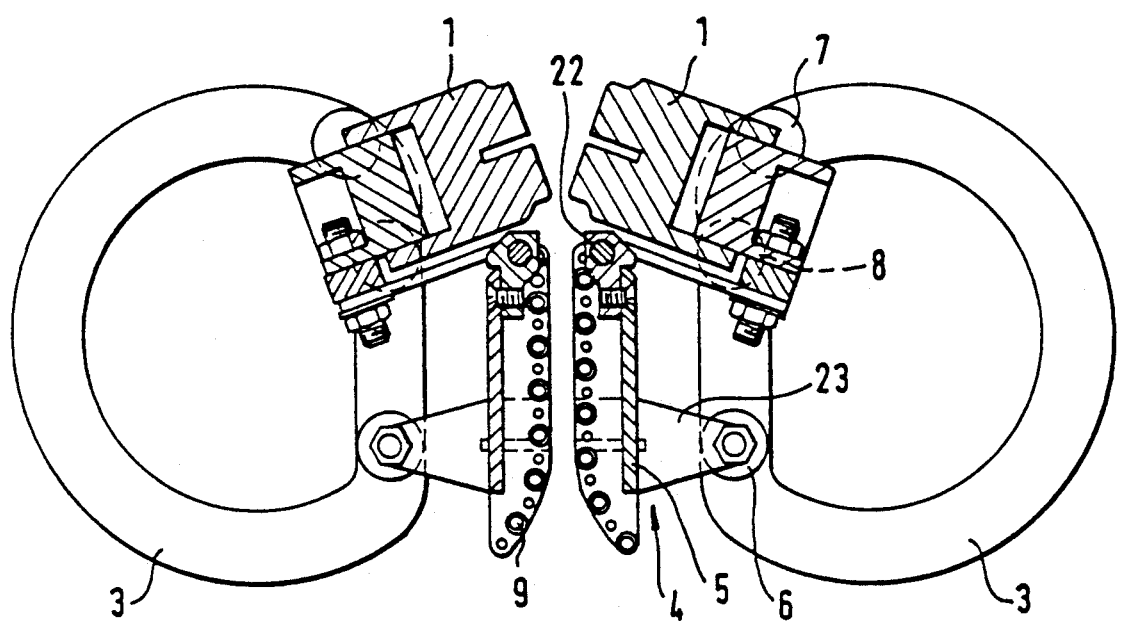
FIG. 4 is a cross-sectional view along the line IV—IV of FIG. 3.

FIG. 4 illustrates a schematic side cross-sectional view of a portion of the arrangement illustrated in FIG. 1. It can thereby be recognized that each of the cross-welding jaws 1 has guide rollers 7, 8 at its lower end area, which guide rollers are guided in the cam tracks 3. The cross-welding jaws are constructed in duplicate in a conventional manner in order to produce two parallel cross-welding jaws.

The arrangement of FIG. 1 shows that the cross-welding jaw illustrated on the right in FIG. 4 moves counterclockwise along the cam track 3.

The cross-welding jaws 1 are jointedly connected at their front end areas (viewed in the direction of movement) at 22 to a carrier 5 of the squeezing member 4. The end of the carrier 5, which end does not face the cross-welding jaw 1, is connected to a foot 23, which has at its end a guide roller 6 rotatably supported. The guide roller 6 is also guided in the cam track 3. Thus it is assured that the cross-welding jaws 1 move each together with the squeezing member 4 connected to said jaws 1 along the cam track 3.

Figure 2:
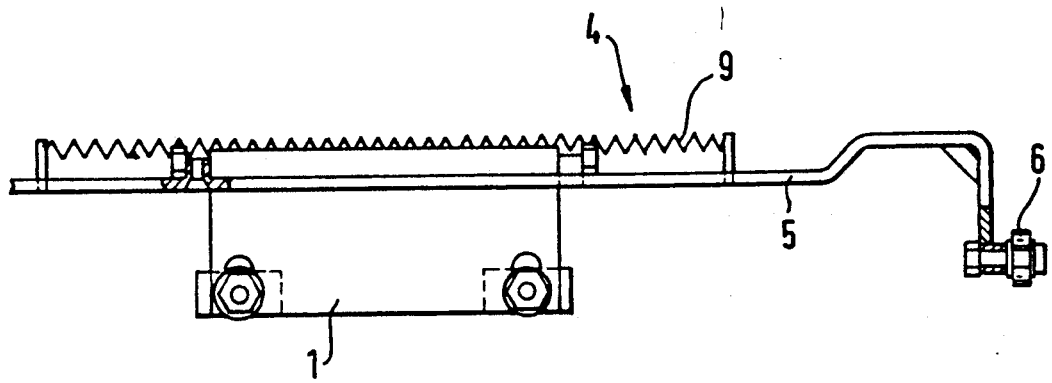
FIG. 2 is a partial side view of one cross-welding jaw and one squeezing member of the invention.
Figure 3:
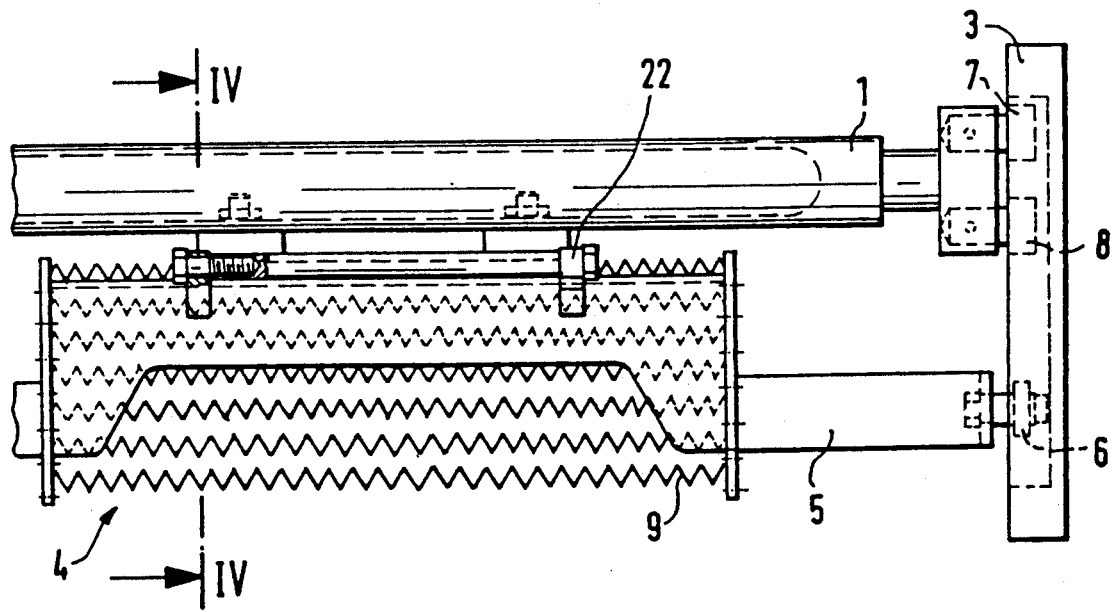
FIG. 3 is a top view of the arrangement shown in FIG. 2.

FIGS. 2 and 3 show, each schematically, simplified illustrations, a side view and a top view, of a cross-welding jaw 1 and the associated squeezing member 4.

FIGS. 2 and 3 show that the lateral end areas of both the cross-welding jaw 1 and also the squeezing member 4 have guide rollers 6, 7, 8 guided in lateral cam tracks. Thus two cam tracks 3 are provided on each side of the tubular bagging machine.

Several spiral springs 9 are fastened on the carrier 5 of the squeezing member 4. The spiral springs 9 extend parallel with respect to the cross-welding jaw 1, are held under an initial tension and are used to bear on the foil tube or rather the tubular bag. FIGS. 2 and 3 show that the squeezing member 4 has a greater length than the active length of the cross-welding jaw 1 in order to secure in this manner that the air in the foil bag is squeezed out uniformly.

FIG. 4 shows that the front end of the squeezing member 4 (viewed in the direction of movement) is bent away from the center plane of the tubular bag 2, that is, in direction of the lower part of the cam track 3. This bend simplifies the approach of the squeezing member to a tubular bag 2 and prevents damages of the same.

The length of the squeezing member 4 corresponds substantially with the length of the rectilinear area of the cam track 3 so that, as shown in FIG. 4, the squeezing action of the squeezing member is the greatest when the cross-welding jaws 1 are in an operating cycle shortly before approaching the foil tube 16.

Caused by the barlike design of the squeezing member 4 shown in particular in FIG. 2 it is guaranteed that the squeezing member has a sufficient elasticity in order to secure on the one hand a sufficient bearing pressure against the tubular bag and to avoid on the other hand a damage of the bag.

FIG. 1 shows that two cross-welding jaws 1 and two squeezing members 4 respectively connected thereto are provided on each cam track 3 in the exemplary embodiment of the tubular bagging machine of the invention. The pairs of connected cross-welding jaws 1 and squeezing members 4 are offset each at substantially 180° with respect to one another, with reference to the direction of rotation. Thus it is possible according to the invention to reduce the speed of movement of the cross-welding jaws 1 and of the squeezing members 4, since these are each used only during alternate operating cycles for the manufacture of a tubular bag.

Each one shaft 24 is supported centrally with respect to each cam track 3. A drive member 10 is connected to the shaft 24. The ends of the drive member 10 are each drivingly connected to the cross-welding jaws 1. By rotating the shaft 24 and thus the drive member 10 the cross-welding jaws 1 and the squeezing members 4 coupled with the cross-welding jaws 1 are moved along the cam tracks 3.

FIG. 1 shows furthermore that the cam tracks 3, the squeezing members 4 and the cross-welding jaws 1 are each constructed symmetrically with respect to the center plane of the tubular bag 2 in the illustrated exemplary embodiment.

The invention is not limited to the illustrated exemplary embodiment, rather many possibilities for modifications exist within the scope of the invention for the man skilled in the art. In particular it is possible to design the squeezing members in many different ways, for example, as plates of an elastic material or a similar material.

I claim:

1. In a tubular bagging machine having at least two cross-welding jaws arranged on opposed sides of an elongated foil tube to be welded to form tubular bags, closed cam track means arranged on both sides of the foil tube, said cam track means having a substantially circularly extending portion and a substantially rectilinearly extending portion, said rectilinearly extending portions extending parallel to one another to define a predetermined spacing therebetween between which the foil tube is oriented and moved in a direction that is parallel to said rectilinearly extending portions, said cross-welding jaws having guide roller means thereon received in said am track means so that, in response to a circuitous movement of said guide roller means in said cam track means, said cross-welding jaws are moved toward and into pinching engagement with said foil tube to form a welded seam as well as together parallel to said rectilinearly extending portions and while pinching said foil tube therebetween as well as away from each other, said tubular bagging machine further having a squeezing member arranged ahead in the direction of movement of each said cross-welding jaw, which squeezing member is movable together with said cross-welding jaw and having means thereon being pressed against the sidewalls of the foil tube, the improvement wherein said means on each squeezing member includes plural initially tensioned springs arranged parallel to one another and transversely with respect to a longitudinal axis of the foil tube and function, when pressed against the foil tube, to squeeze gases out of a still open end of a portion of the foil tube forming a tubular bag cross-welded at an end thereof remote from the still open end, wherein each said squeezing member includes a carrier for supporting said plural springs, the one end of each of which is hingedly supported on a respective one of said cross-welding jaws and the other end of each having a cam roller guided in said cam track means and maintaining said carrier and said springs carried thereby a predetermined spaced apart distance from one another which is less than the diameter of the foil tube to squeeze the foil tube to a partially closed condition, wherein said squeezing member has a finite length which corresponds substantially with the length of said rectilinearly extending portion of said cam track means so that air present inside the foil tube will be squeezed out of the foil tube over a length thereof equalling said finite length and ahead of the location whereat said cross-welding jaws come together to form a welded seam.

2. The tubular bagging machine according to claim 1, wherein said plural springs are substantially evenly distributed over said finite length of said squeezing ember for bearing on the foil tube and for squeezing gases out of the foil tube after the foil tube has been cross-welded at said one end.

3. The tubular bagging machine according to claim 2, wherein said springs are each a spiral spring arranged transversely with respect to the foil tube.

4. The tubular bagging machine according to claim 3, wherein said spiral springs are each a tension spring.

5. The tubular bagging machine according to claim 1, wherein said carrier of said squeezing member is rounded at a front end area remote from said cross-welding jaw and facing toward the longitudinal axis of the foil tube.

6. The tubular bagging machine according to claim 1, wherein two cross-welding jaws and two squeezing members are arranged on each cam track means.

7. The tubular bagging machine according to claim 1, wherein a cam track is provided at each lateral end of the associated cross-welding jaw and of the associated squeezing member.

8. The tubular bagging machine according to claim 1, wherein a rotatable drive member is centrally arranged relative to each cam track means which drive member is drivingly connected to a respective cross-welding jaw.

9. The tubular bagging machine according to claim 1, wherein the oppositely lying cross-welding jaws, squeezing members and cam track means are symmetrically oriented with respect to a central plane of the foil tube and which contains the welded seam.

* * * * *